United States Patent [19]
Berberich, Jr. et al.

[11] Patent Number: 5,818,919
[45] Date of Patent: Oct. 6, 1998

[54] INTER-NETWORK CALL FORWARDING WITH SUBSCRIBER IDENTITY

[75] Inventors: Edward Charles Berberich, Jr., Green Brook; Siang Gek Heng, Freehold; Susan Suh-Jen Lee, Matawan; Maura Elizabeth Marcus, Oakhurst; Courtney Aldington Pinnock, Howell, all of N.J.; John Richard Rosenberg, Elmhurst, Ill.; John James Schubel, Holmdel, N.J.

[73] Assignee: AT&T Corp., Middletown, N.J.

[21] Appl. No.: 680,190

[22] Filed: Jul. 15, 1996

[51] Int. Cl.[6] ........................................ H04M 3/42
[52] U.S. Cl. .................... 379/211; 379/114; 379/207; 379/219; 379/230
[58] Field of Search .................... 379/111, 112, 379/113, 114, 115, 201, 207, 210, 211, 212, 219, 220, 221, 229, 230; 370/389, 392, 393, 466, 467

[56] References Cited

U.S. PATENT DOCUMENTS

| | | | |
|---|---|---|---|
| 5,274,700 | 12/1993 | Gechter et al. | 379/211 |
| 5,377,186 | 12/1994 | Wegner et al. | 379/211 |
| 5,416,834 | 5/1995 | Bales et al. | 379/211 |
| 5,459,720 | 10/1995 | Iliev et al. | 370/393 |
| 5,463,683 | 10/1995 | Collins et al. | 379/211 |
| 5,524,142 | 6/1996 | Lewis et al. | 379/112 |
| 5,537,464 | 7/1996 | Lewis et al. | 379/211 |
| 5,553,128 | 9/1996 | Grimes | 379/211 |

*Primary Examiner*—Daniel S. Hunter
*Assistant Examiner*—Scott Wolinsky
*Attorney, Agent, or Firm*—Robert B. Levy

[57] ABSTRACT

An automated intelligent network system and method for providing automatic forwarding of calls to enhanced telecommunications service platforms across network boundaries while preserving subscriber identity. In accordance with the present invention, the values of defined parameters that are maintained with a call according to established network protocols and passed between networks during call processing are controlled such that, using these controlled values, the subscriber identification information reaches the platform where the enhanced service is implemented in different network than that of the service subscriber. An alternative embodiment of the invention provides a way for enhanced telecommunications services platforms to identify both the subscriber and the calling party when calls are automatically forwarded to the platform across network boundaries.

19 Claims, 4 Drawing Sheets

5,818,919

INTER-NETWORK CALL FORWARDING WITH SUBSCRIBER IDENTITY

TECHNICAL FIELD

This invention relates to communication networks, and more particularly to providing automatic call forwarding to enhanced communication services platforms across network boundaries with retained subscriber identity.

BACKGROUND OF THE INVENTION

Advances in telecommunications technology have made possible enhanced telecommunications services such as voice messaging, call forwarding, call roaming and paging. Intelligent network components that are well-known in the art and are commercially available, e.g., the Lucent A-I-Net™ advanced intelligent network family of products, have been used to construct networks that permit such enhanced telecommunications services to be provided on a network level.

The ability to offer automatic forwarding of calls to network-based enhanced communications services while retaining the identity of the subscriber (i.e., the party that orders and is billed for the enhanced service) is limited by current practices in the telecommunications network environment to circumstances where the subscriber is on the same network as the resident platform for the enhanced service. For example, when a local exchange carrier (LEC) provides an enhanced service capability, such as voice messaging, a call coming in to the LEC subscriber is, if unanswered, typically forwarded either to a messaging platform which is directly connected to the same LEC switch as the subscriber's line, or to a messaging platform on another switch within the same LEC network. Similarly, in a typical company environment where the company has a PBX serving its employees, an enhanced service such as voice messaging for the employees' telephone lines would be implemented in a voice messaging system connected to the company's PBX.

When a call is routed internally within a network, or externally between networks, the call is accompanied by a set of call parameters set in accordance with a standard ANSI signaling protocol known as SS7. These call parameters, when set, provide information about the call to the network. Two subsets of the SS7 ANSI standard protocol known as ISUP and TCAP are commonly used with call setup and database queries, respectively.

Under current telecommunication network practices, however, not all of the signaling protocol call parameters are utilized when a call is routed across network boundaries. For example, one such parameter corresponding to the calling party number (which typically contains the number of the originating caller) may or may not be passed between networks, depending upon inter-network agreements.

As a practical reality, there are only two party-specific numbers that are included among the set of parameters from the ISUP standard protocol that are commonly passed between different networks along with the inter-network routing of a call. These parameters correspond to a called party number and a charge party number. Initially, the called party number parameter corresponds to the number dialed by the calling party. However, if the call is to be forwarded to, e.g., another directory number or to a service platform, the parameter is reset so that it then corresponds to the number associated with that "forward to" number or the number of the platform to which the call is to be forwarded. The charge party parameter is generally passed across network boundaries with a call pursuant to inter-network agreements. However, the charge party parameter is typically set, if at all, to the number of the party originally placing the call. Although under certain conditions the charge party parameter may be set to the subscriber's number pursuant to BellCore AIN (advanced intelligent network) specifications, but this is not always the case.

Therefore, once a call is forwarded to a network different from that of the subscriber, the subscriber identification is typically lost. This occurs because the called party parameter, although originally set with the subscriber number, is reset with the platform number or telephone number to which the call is to be forwarded and there is typically no assurance that the subscriber number is retained in the charge party parameter. There is no ISUP inter-network transfer of redirection information which would separately maintain the subscriber number.

The loss of subscriber identity affects the ability of the enhanced service to use subscriber-identifying information in connection with the service. One such use would be for automatic billing purposes; the subscriber is more likely to be willing to pay on an automated basis for the enhanced service than is the caller. Other uses of subscriber information would depend upon the particular application. For example, a voice messaging service could use subscriber information to direct calls to individualized mailboxes for each subscriber.

Similarly, it may also be desirable for an enhanced service to retain identification of the calling party along with a way to identify the subscriber. Again considering the voice messaging example, a personalized greeting by the subscriber for a calling party could be used if the enhanced service could identify both the subscriber and the calling party.

Thus, providing automatic forwarding of calls to an enhanced services platform across networks is impractical in today's telecommunications network environment. In order to retain subscriber information for billing and identification purposes by the enhanced service, the subscriber must be located in the same network as that providing the enhanced service. Otherwise, subscriber identification information is unavailable to the enhanced service and, if the service is to be billed, other billing means must be employed, such as credit card or calling card payment by the caller; these, in turn, require an interruption in the call processing to handle the payment and may result in lost services if the caller does not wish to pay for the service.

What is desired is a practical way to provide inter-network call forwarding to automatically redirect calls made to a subscriber along to an enhanced service platform in another network while preserving subscriber identity. It is also desired to have a practical way to redirect calls made to a subscriber along to an enhanced service platform in another network so that the platform can identify both the subscriber and the calling party. In either case, the platform could make the desired use of subscriber (and, where available, calling party) information for application-specific use as well as for use in automated enhanced service billing procedures.

SUMMARY OF THE INVENTION

An object of the present invention is to utilize the capabilities of currently available intelligent networks, such as AIN, to provide automatic forwarding of calls to enhanced telecommunications service platforms across network boundaries while preserving subscriber identity. Another object of the present invention is to provide automatic forwarding of calls to enhanced telecommunications services platforms across network boundaries while providing a way for the platform to identify both the subscriber and the calling party. In accordance with the present invention, the values of defined parameters that are maintained with a call according to established network protocols and passed between networks during call processing are controlled in a unique way so that, using these controlled values, the identification information reaches the platform where the enhanced service is implemented in a network different than that of the service subscriber.

DETAILED DESCRIPTION

Before describing an illustrative embodiment of the invention, it will be useful to describe in a general manner the key intelligent network elements—and their interaction—which can be used to implement the present invention. An intelligent telecommunications network architecture may be comprised of computer-based network components that are well-known in the art and are commercially available, such as the Lucent A-I-Net™ advanced intelligent network family of products; other vendors make compatible products. Such an intelligent network architecture superimposes on an existing telecommunications system a modular configuration of network elements which, in turn, allows enhanced telecommunications services to be provided on a network level.

Figure 1:
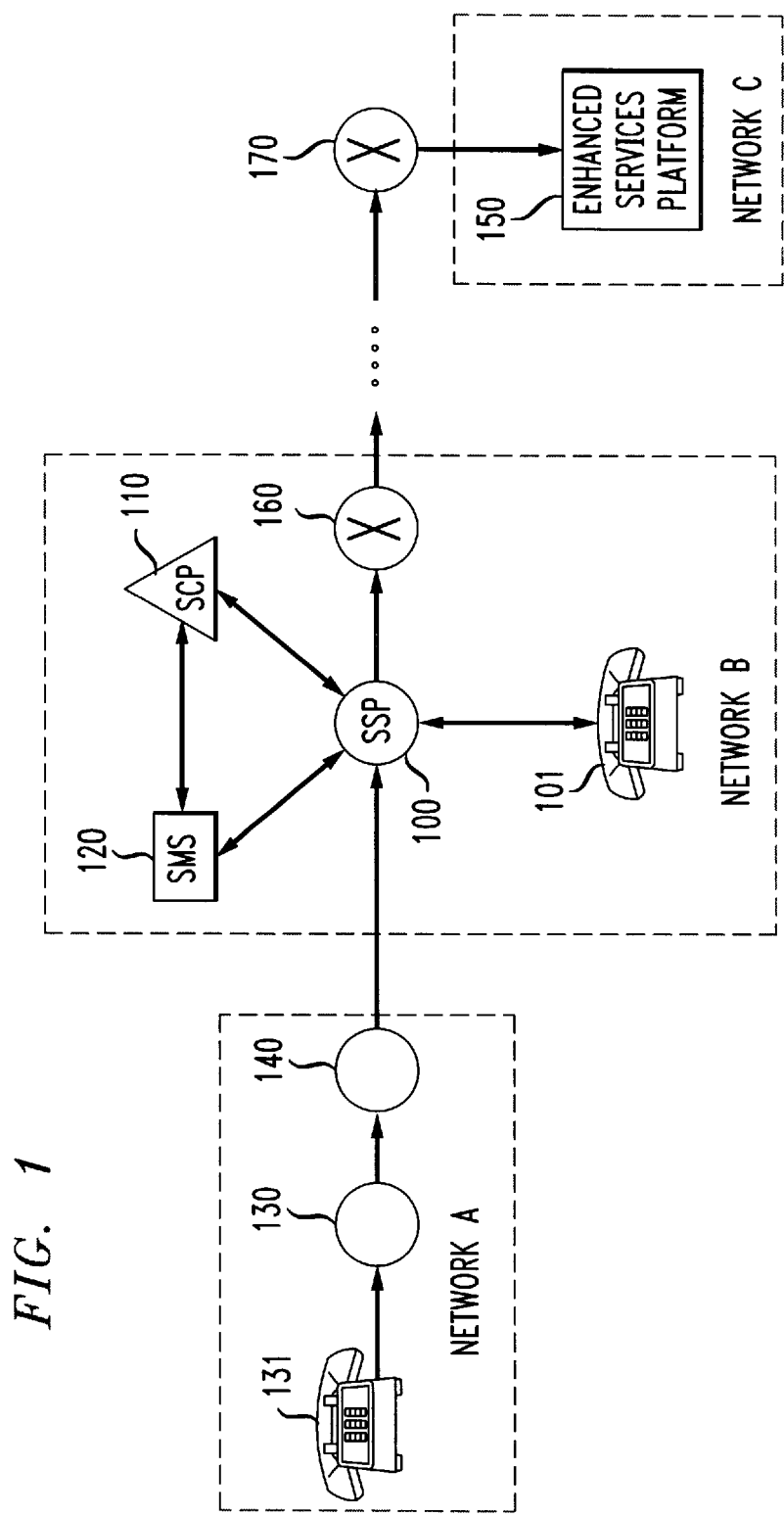
FIG. 1 shows an intelligent telecommunications network architecture in which the present invention may be implemented.

In an AIN architecture, switching functions are performed by the base network in a conventional manner. With reference to FIG. 1, the intelligent network includes a service switching point (SSP) 100 and a service control point (SCP) 110. The intelligent network may also include a service management system (SMS) 120. One skilled in the art will appreciate that the intelligent network elements could be owned or controlled by a local exchange carrier (LEC), an interexchange carrier (IXC), a competitive access provider, or some combination of the three; for example, SSP 100 may be owned or controlled by a subscriber's LEC, while SCP 110 may be owned or controlled by an independent long distance carrier.

SSP 100 is a switch that operates to recognize service requests, requests call handling instructions from SCP 110, and executes those instructions to complete a telephone call. SSP 100 provides intelligent network "triggering"—detecting a condition which requires the SSP to initiate an intelligent network service by sending a query to SCP 110. An enhanced service has its own "trigger profile," or set of data, that through the SCP assigns the service a unique point of entry into intelligent network functions. SSP 100 also formulates and transmits requests to the SCP 110 and processes replies and requests from the SCP 110. In addition, the SSP 100 creates and plays intelligent network announcements formulated by the network service provider (e.g., LEC or IXC), and transmits event messages (such as busy or no reply signals) to the SCP 110. SSP 100 illustratively is a Lucent 5ESS® switch provisioned with Lucent's Advanced Services Platform intelligent software to provide SSP functionality. It should be noted that the SSP 100 is capable of functions other than those mentioned above, such as processing billing records for a call.

SCP 110 is an intelligent network element which stores call control and call routing instructions to be executed by SSP 100. SCP 110 receives and processes event messages from the SSP 100, and formulates and sends responses to the SSP 100. In addition, the SCP 110 processes information such as the calling party number, the dialed number, the time of day and day of the week of the call, and various other call parameters. An example of an SCP capable of implementing the foregoing functions is Lucent's A-I-Net™ SCP. SCP 110 is also typically equipped to interface with and receive commands from the SMS 120.

SMS 120 is a management and provisioning system that serves as an intelligent network service administration platform. The SMS 120 formulates and sends commands to the SCP 110 to control services and service features. An example of an SMS is the Lucent A-I-Net™ service management system.

One important intelligent call processing concept is "triggering." A trigger is an occurrence of an event and/or the satisfaction of certain conditions which results in switch SSP 100 sending to SCP 110 a query message requesting call processing instructions. Triggers can be originating triggers, mid call triggers, or terminating triggers. Examples of originating triggers are off-hook immediate, offhook delay triggers, and custom dialing plan triggers. An example of a mid-call trigger is the busy condition. An example of a terminating trigger is the ring-no answer condition. As set forth in U.S. patent application Ser. No. 08/762,532 by Robert Rubin, entitled "System And Method For Handling Calls To Network Subscribers Who Change Their Telephone Number", filed Dec. 9, 1996, a continuation of U.S. patent application Ser. No. 08/502,689, filed Jul. 14, 1995 and now abandoned, another example of a terminating trigger is one that could be generated whenever a dialed number matches one from which a subscriber has relocated, for use in a call-forwarding or messaging service to the subscriber.

To continue with FIG. 1, SSP 100 is connected to subscriber 101, who has calls handled by the carrier (LEC, IXC, etc.) operating SSP 100. A calling party 131, whose call to subscriber 101 invokes and executes an enhanced service, originates a call which is routed through LEC 130 which handles the calls for calling party 131. From LEC 130, the call may be routed, illustratively, to SSP 100 directly or through switch 140 for call processing.

An enhanced service platform 150 which implements the invoked enhanced service is illustratively shown connected to a network other than the network handling the subscriber's calls through a terminating switch 170. A call may be routed from SSP 100 to enhanced service platform 150 through a network switch 160, which may be a toll switch or IXC switch, along to terminating switch 170. Alternatively, there may be additional network switches utilized between switch 160 and switch 170. Switches 160 and 170 may illustratively each be a Lucent 4ESS® switch.

The platform 150 may be implemented on network components such as the Lucent DEFINITY™ PBX and Lucent Intuity Platform, which may, illustratively, be used to implement an enhanced service such as voice messaging. Where platform 150 is implemented on such components, an appropriate interface between enhanced services platform 150 and switch 170 may be the Primary Rate Interface (PRI), which is a protocol well-known in the telecommunications industry. Alternatively, other interfaces, such as the ISUP signaling protocol, could be employed to facilitate call handling between switch 170 and platform 150.

Where a call is forwarded to platform 150 using a PRI interface, further manipulation of parameters is required. Typically, when a toll switch (e.g., switch 170) connects to a platform (e.g., platform 150) using the PRI interface, the switch maps certain ISUP parameters to PRI information elements for routing a call to the platform. In commercial practice, there are only two party-specific PRI information elements used; they are known as the calling party number information element (IE) and the called party number IE. For example, it is common commercial practice to map the ISUP parameter corresponding to the calling party to the PRI called party number IE and to map the ISUP parameter corresponding to the called party number or the dialed number to the PRI called party number IE. The PRI called party IE (containing the dialed number) is typically used, e.g., by a PRI-compatible platform to route the call in the platform to, illustratively, a mailbox for the dialed number.

However, in the present invention, in order to pass the subscriber information along to platform 150, it is the ISUP parameter corresponding to the charge party, rather than the ISUP parameter corresponding to the calling party, that must be mapped to the PRI calling party number IE. The ISUP parameter corresponding to the called party number contains the telephone number for platform 150, which is mapped to the PRI called party number IE and the call is then routed to platform 150. The platform must know to use the PRI calling party number IE rather than the PRI called party number IE in order to extract subscriber ID information to route the call in the platform, e.g., to a mailbox. One way for the platform to know to use the calling party IE is to use a special platform number for calls to be forwarded in accordance with the present invention; if this is done, the platform can examine the called party IE (containing the platform number), detect the special platform number, and use the subscriber information in the calling party information element as described above.

Figure 2:
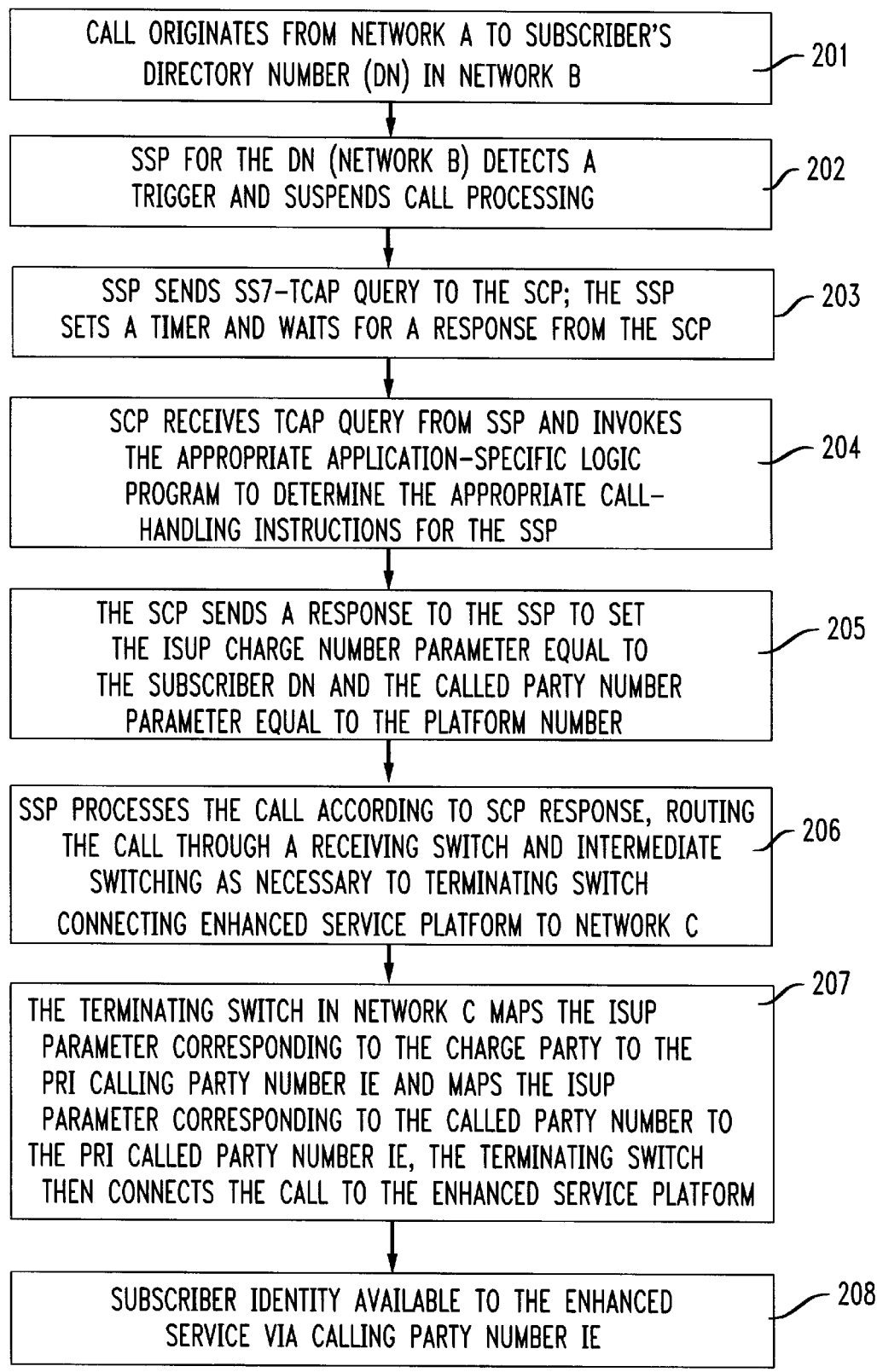
FIG. 2 shows a generalized call flow diagram for forwarding calls to enhanced service platforms across networks in accordance with an embodiment of the present invention.
Figure 3:
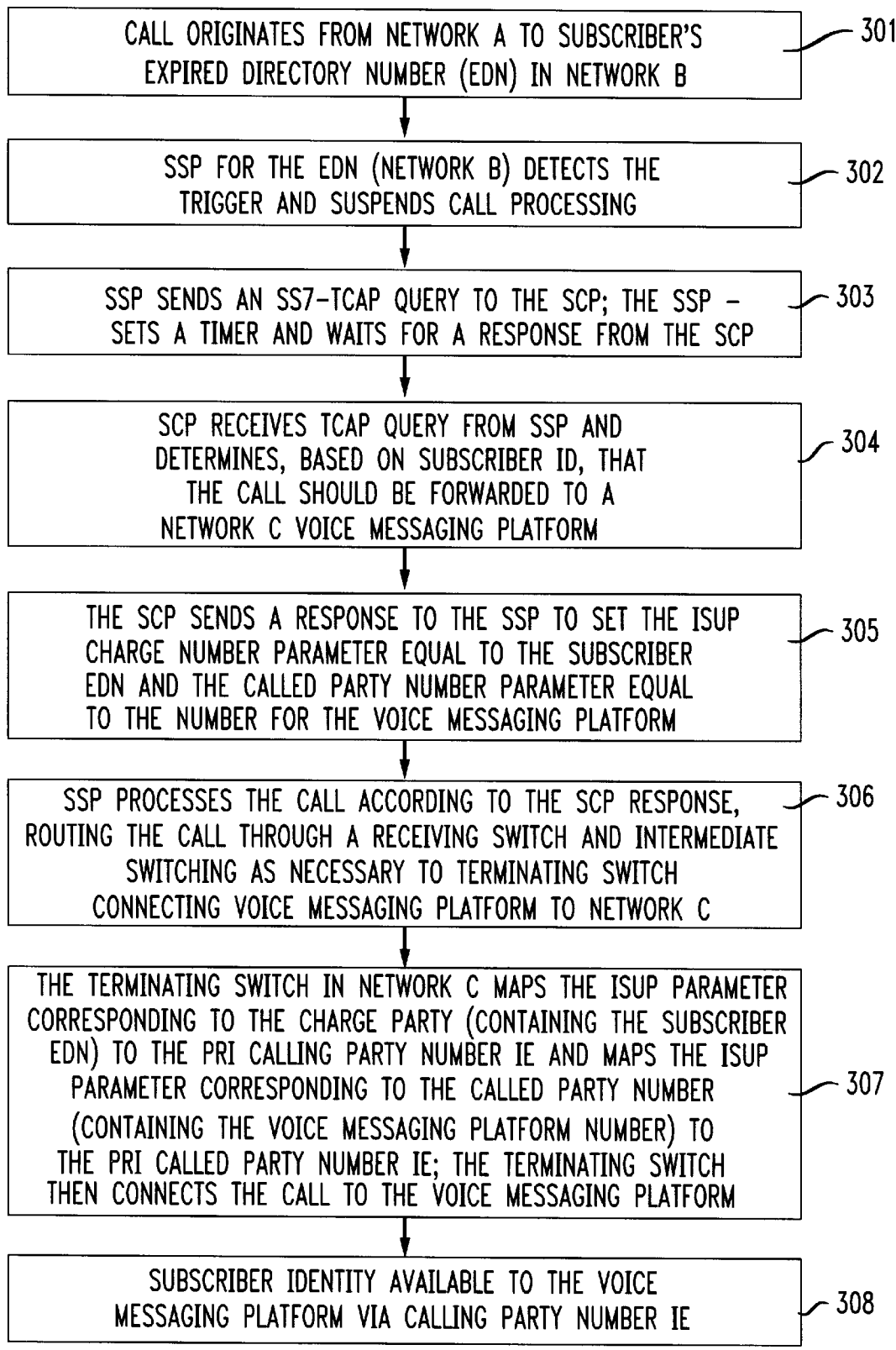
FIG. 3 shows an example of a call flow diagram for forwarding calls to a voice messaging platform across networks in accordance with an embodiment of the present invention.
Figure 4:
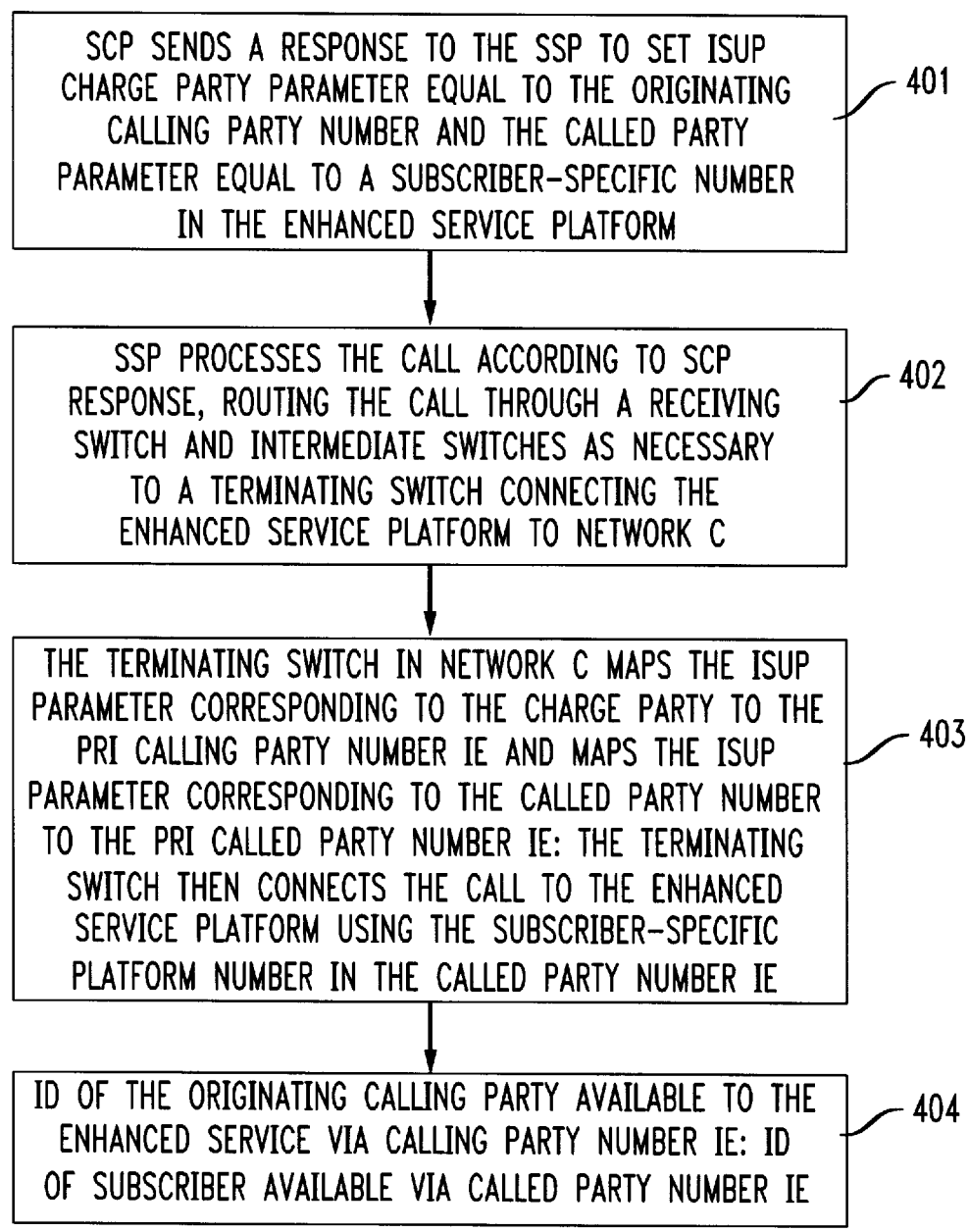
FIG. 4 shows a variation of the call flow for forwarding calls to enhanced service platforms across networks in accordance with another embodiment of the present invention.

From the architecture shown in FIG. 1, the present invention is intended to permit a calling party in one network to call a service subscriber in either the same or another network, where the enhanced services are provided by a platform residing outside of the network of the service subscriber. In the specific example described below, a calling party 131 is located in network A and accesses an enhanced service in connection with a call to subscriber 101 who is connected to SSP 100 in network B, and the enhanced services are provided by enhanced service platform 150 residing in network C. The method of preserving subscriber information and, if desired, calling party information that is the object of the present invention is now described more fully with respect to the call flow processing as depicted in FIGS. 2, 3 and 4. It is assumed that the call flow processing to be described below is carried out in the domain of an intelligent network architecture such as that described above with respect to FIG. 1.

FIG. 2 shows call flow processing for forwarding a call to an enhanced service platform that resides in a network different than that of the subscriber. For purposes of illustration, different telecommunications networks will be denoted as network A, network B, etc. Also for purposes of illustration, the interface between the enhanced service platform and the terminating switch is PRI. In the call flow described below, a call originates in network A, is directed to subscriber's number in network B and is ultimately forwarded to an enhanced service platform in network C. It is assumed that the called party (i.e., the subscriber) subscribes to an enhanced service, and that the subscriber intends that a call placed to the subscriber will invoke the enhanced service. Those skilled in the art will recognize that, in general, whether or not every call to the subscriber invokes the enhanced service is application specific and may vary from one enhanced service to the next.

Referring to FIG. 2 at step 201, a caller from network A dials a subscriber's directory number (DN) in network B. When DN is dialed, the call is directed to SSP in network B (step 202) which detects a trigger (for the enhanced service) associated with the DN and suspends call processing. As a result, this triggers the process by which the enhanced service will ultimately be invoked. Next, at step 203 the SSP assembles an SS7-TCAP query to send to the SCP; the subscriber DN and the calling party number are sent as part of the query. The SSP then sets a timer and waits for a response from the SCP.

The SCP receives the TCAP query from the SSP at step 204 and invokes an appropriate application-specific logic program to determine, based on the subscriber's record, that an enhanced service is being requested and that, as a result, the call should be forwarded to the requested enhanced service platform located, illustratively, in network C. At step 205, the SCP sends an SS7-TCAP response to the SSP which instructs the SSP to set certain SS7-ISUP parameters. The ISUP parameter names and fields are subject to established protocol, but the SCP can choose the values to be placed in the fields for a particular application; in order to have the call forwarded to the enhanced service platform number, the ISUP parameter corresponding to the called party must be set to the enhanced service platform number. In accordance with the present invention, the SCP determines that the ISUP parameter corresponding to the charge party should be set by the SSP to the subscriber's DN. In this way, the invention ensures that subscriber DN is preserved in the charge number parameter. If this step is not taken, the subscriber DN could be lost because the charge party parameter may otherwise have been set to the calling party number and the called party number, which originally contained the subscriber DN when the call was routed to the SSP, must be changed to the platform number for the enhanced service platform so the call can, once routed from network B to network C, be forwarded to the telephone number for the platform.

Continuing with FIG. 2, upon receipt of SS7-TCAP response from SCP, in step 206 the SSP processes the call accordingly, setting the ISUP parameters to the above-described values assigned by the SCP and causing the call to be routed through a toll switch (TS) or interexchange carrier (IXC) switch, through intermediate switches if necessary, to a terminating switch in network C to which the enhanced service platform is directly connected. This is done in accordance with the setting of the called party parameter containing the platform telephone number in network C. The terminating TS or IXC switch at step 207 maps the ISUP parameter corresponding to the charge party to the PRI calling party number IE and maps the ISUP parameter corresponding to the called party number to the PRI called party number IE. The terminating switch then connects the call to the enhanced service platform. At step 208, the enhanced service platform can then use the PRI calling party number IE to extract the subscriber identity. By extracting the subscriber identity in this way, the enhanced services platform can, e.g., deliver services that are tailored to the subscriber.

It should be evident to those skilled in the art that an enhanced service provider may use a single platform to deliver a set of differing enhanced services. One means for doing so efficiently is to use different platform numbers (for which calls the same platform), with unique platform numbers corresponding to unique services.

Similarly, an enhanced service provider may use a single platform to deliver services for direct calls as well as forwarded calls, or even a combination of direct/forward calls and unique services. Unique platform numbers could be used corresponding to direct and forwarded calls, respectively. In this way, an enhanced service platform can determine, based on the called party number IE, to which platform number the call has been directed. Calls to the platform "direct" number may be handled in the customary way; calls to the "forward" number may be handled in the way described above by pulling the desired information, e.g., the subscriber ID, which has been retained in accordance with this invention.

The call flow processing set out above will now be described more specifically with reference to an example of an enhanced service. In FIG. 3 is shown call flow processing for an enhanced service consisting of a voice messaging service for a subscriber who has an expired directory number. A person's telephone number may expire for several reasons, e.g., if the person relocates to an area outside of the local calling area for the number (an example of voice messaging for a subscriber who has moved is described in the Rubin Application). Those skilled in the art will recognize that an enhanced voice messaging service for subscribers with expired telephone numbers is only one of a number of possible enhanced services to which this invention applies.

Referring to FIG. 3 at step 301, a caller from network A dials a subscriber's expired directory number (EDN) in network B. When the EDN is dialed, the call is directed to SSP in network B (step 302) which detects a trigger associated with the EDN and suspends call processing. This triggers the process by which the voice messaging service is ultimately invoked. Next, at step 303 the SSP assembles a SS7-TCAP query to send to the SCP; the subscriber EDN and the calling party number are sent as part of the query. The SSP then sets a timer and waits for a response from the SCP.

The SCP receives the TCAP query from the SSP at step 304 and invokes a program to determine that, based on the subscriber's EDN record, the call should be forwarded to a voice messaging platform in network C. The voice messaging platform number may be reached, e.g., by connecting a call to a single entry point in the platform through an "800" number or through another telephone number. At step 305, the SCP sends an SS7-TCAP response to the SSP. In accordance with the present invention, the SCP determines that the ISUP parameter corresponding to the charge party should be set by the SSP to the subscriber's EDN (or, optionally, the subscriber's new number if available). As described above, the ISUP parameter corresponding to the called party must be set to the telephone number for the voice messaging platform in order to route the call to the platform. In this way, the invention ensures that the identity of the subscriber is retained by placing the subscriber EDN (or new telephone number) in the charge number parameter.

Continuing with FIG. 3, upon receipt of the TCAP response from SCP, in step 306 the SSP processes the call accordingly, setting the ISUP charge party and called party parameters as instructed by the SCP and causing the call to be routed through a toll switch (TS) or interexchange carrier (IXC) switch, through intermediate switches if necessary, to a terminating switch in network C to which the voice messaging platform is directly connected. This is done in accordance with the setting of the called party parameter containing the platform telephone number in network C. The terminating TS or IXC switch at step 307 maps the ISUP parameter corresponding to the charge party (containing the subscriber EDN) to the PRI calling party number IE and maps the ISUP parameter corresponding to the called party number (containing the number for the voice messaging platform) to the PRI called party number IE. The terminating switch then connects the call to the voice messaging platform. At step 308, the voice messaging platform can then use the PRI calling party number IE to extract the subscriber identity. By extracting the subscriber identity in this way, the voice messaging platform will be able to use the subscriber information to personalize the messaging service to the subscriber in some fashion. For example, the voice messaging platform may be programmed to use the subscriber identity information to deliver the call to a subscriber's personalized individual mailbox contained within the platform. The subscriber identity could also, e.g., be used by the voice messaging service to send a notification to the subscriber that there is a message waiting for the subscriber. If the voice messaging service provider has separate, unique platform numbers for forwarded and direct calls, such that the platform number set in the ISUP called party parameter (as determined by the SCP during the forwarding process) corresponds only to forwarded calls, the called party number IE may be used by the voice messaging platform to recognize that the call has been forwarded, i.e., a different platform number would be in the called party number IE in the case of a direct call. These are just a couple of examples of the utility of the present invention.

A variation of the call flow just described in FIGS. 2 and 3 provides a way for an enhanced service platform to identify both subscriber and the calling party. This will be useful in applications where the party-identifying parameters are subject to the above-described limitations and guaranteed retention of calling party ID and subscriber ID is essential. In the embodiment of the invention about to be described, the enhanced service platform will have multiple entry points, each entry point corresponding to a different subscriber. Each entry point could correspond, e.g., to a unique telephone number. Therefore, this embodiment is more practical where there are a limited number of subscribers to be serviced.

The call flow for this embodiment would proceed as in the call flow described above with reference to FIG. 2 up through step 204, at which point the SCP has invoked an application-specific logic program to determine that, based on the subscriber's record, the call should be forwarded to an enhanced service platform located in network C. However, the call handling instructions at this point diverge from the previously-described call flow. Referring to FIG. 4, the SCP at step 401 next sends a response to the SSP, directing the SSP to set the ISUP called party parameter to a subscriber-specific number within the enhanced service platform, which corresponds to an entry point in the service platform; and to set the ISUP charge party parameter to the originating calling party's number (as described above the charge party parameter may be, but is not always, set in this manner). In this way, the calling party's identity is carried forward in the ISUP parameter set; because a platform number specific to the subscriber number is contained in the Called Party ID, the call will be forwarded directly to a specific entry point in the platform corresponding to the subscriber. It is this ability to manipulate the known parameters in order to direct calls to subscriber-specific entry points in the platform that gives the platform the capability of identifying the subscriber.

At the next step, 402, the SSP processes the call according to the SCP response, causing the call to be routed to network C through a receiving toll or IXC switch and, if necessary, through intermediate switches to a terminating switch on network C to which the enhanced service platform is connected. Assuming that there is a PRI interface at the platform, at step 403, the terminating switch maps the ISUP called party and charge party parameters to the PRI called party number IE and calling party number IE parameters, respectively. The terminating switch then directs the call to a subscriber-specific number on the platform which corresponds to the subscriber. The enhanced service can now at step 404 extract the originating caller identity from the PRI calling party number IE and the subscriber identity from the PRI called party number IE. Using this call flow technique, a voice messaging service such as that considered in the expired number example above could receive a call forwarded directly to a subscriber's mailbox and use the caller's number from the PRI calling party number IE to tailor the service to the caller by, e.g., playing back a message from the subscriber tailored to the specific caller, offering the caller a personalized greeting, or announcing the caller to the subscriber.

In summary, automatic call forwarding to an enhanced service platform in a network other than the network of the service subscriber, while retaining the identity of the subscriber, has been described which provides the ability for a subscriber to access enhanced services across network boundaries. A variation of the call forwarding process has been described in which the subscriber and caller identity are provided to the enhanced service.

What has been described is merely illustrative of the application of the principles of the present invention. Other arrangements and methods can be implemented by those skilled in the art without departing from the spirit and scope of the present invention.

What is claimed is:

1. A method for processing a call placed by a calling party to a service subscriber with call forwarding to an enhanced telecommunications service platform in a telecommunications network other than the subscriber's network, comprising the steps of:

(a) receiving call parameters accompanying the call corresponding to a standard protocol from a service switching point (SSP) associated with the subscriber's telephone number;

(b) causing at least one of the call parameters to be set to a value corresponding to a call data value different than a call information value prescribed for the at least one call parameter by an industry specification associated with the standard protocol; and (c) causing the call to be forwarded with the call data value to a telephone number associated with the enhanced service platform.

2. The method according to claim 1, wherein step (b) includes causing a call parameter to be set equal to the subscriber's telephone number.

3. The method according to claim 2, wherein the call parameter to be set equal to the subscriber's telephone number is a call parameter representing a charge party.

4. The method according to claim 3, further comprising the step of causing the enhanced service platform to extract subscriber identification information from the call parameter representing a charge party.

5. The method according to claim 1, wherein step (c) comprises:

(c1) setting a call parameter representing the service subscriber to the telephone number associated with the enhanced service platform; and (c2) causing the SSP to forward the call in accordance with the call parameter representing the service subscriber.

6. The method according to claim 1, wherein step (c) comprises:

(c1) causing the call to be forwarded with the call data value to a terminating network switch connected to the enhanced service platform; and (c2) causing the terminating network switch to map a call parameter to a Primary Rate Interface (PRI) calling party information element, said mapped call parameter not typically mapped to the PRI calling party information element.

7. The method according to claim 6, wherein step (b) includes causing a call parameter representing a charge party to be set equal to the subscriber's telephone number.

8. The method according to claim 7, wherein the call parameter representing a charge party is mapped to the PRI calling party information element.

9. The method according to claim 8, further comprising the step of causing the enhanced service platform to extract subscriber identification information from the PRI calling party information element.

10. The method according to claim 1, wherein step (b) includes setting at least one call parameter equal to a telephone number corresponding to the calling party.

11. The method according to claim 10, wherein the call parameter to be set equal to a telephone number corresponding to the calling party is the call parameter representing a charge party.

12. The method according to claim 11, wherein step (c) comprises:

(c1) setting a call parameter representing the service subscriber to a subscriber-specific number associated with the enhanced service platform; and (c2) causing the SSP to forward the call in accordance with the call parameter representing the service subscriber.

13. The method according to claim 12, further comprising the step of causing the enhanced service platform to extract subscriber information from the call parameter representing the service subscriber and to extract calling information from the call parameter representing a charge party.

14. The method according to claim 11, wherein step (c) comprises:

(c1) setting a call parameter representing the service subscriber, to a subscriber-specific number associated with the enhanced service platform;

(c2) causing the call to be forwarded with the call data value to a terminating network switch connected to the enhanced service platform; and (c3) causing the terminating network switch to map the call parameter representing a charge party to a Primary Rate Interface (PRI) calling party information element and to map the call parameter representing the service subscriber to a PRI called party information element.

15. The method according to claim 14, further comprising the step of causing the enhanced service platform to extract subscriber information from the PRI called party information element and to extract the calling party information from PRI calling party information element.

16. An automated intelligent network system for processing a call placed by a calling party to a service subscriber with call forwarding to an enhanced telecommunications service platform in a telecommunications network other than the subscriber's network, comprising:

a service switching point (SSP) associated with the subscriber's telephone;

a service control point (SCP) for receiving call parameters accompanying the call corresponding to a standard protocol from the SSP;

first means for causing at least one of the call parameters to be set to a value corresponding to a call data value different than a call information value prescribed for the at least one call parameter by an industry specification associated with the standard protocol; and second means for causing the call to be forwarded with the call data value to a telephone number associated with the enhanced service platform.

17. The automated intelligent network system according to claim 16, wherein the second means sets a call parameter representing a charge party equal to the subscriber's telephone number.

18. The automated intelligent network system according to claim 16, wherein the second means includes:

third means for causing the call to be forwarded with the call data value to a terminating network switch connected to the enhanced service platform; and fourth means for causing the terminating network switch to map a call parameter to a Primary Rate Interface (PRI) calling party information element, said mapped call parameter not typically mapped to the PRI calling party information element.

19. The automated intelligent network system according to claim 18, wherein the fourth means maps a call parameter representing a charge party to the PRI calling party information element.

* * * * *